United States Patent [19]
Iizuka

[11] Patent Number: 5,203,235
[45] Date of Patent: Apr. 20, 1993

[54] CONTROL SYSTEM FOR AUTOMOTIVE AUTOMATIC TRANSMISSION

[75] Inventor: Naonori Iizuka, Shizuoka, Japan

[73] Assignee: Jatco Corporation, Fuji, Japan

[21] Appl. No.: 850,283

[22] Filed: Mar. 12, 1992

[30] Foreign Application Priority Data

Mar. 27, 1991 [JP] Japan ............................... 3-87586

[51] Int. Cl.[5] ............................................. B60K 41/26
[52] U.S. Cl. ................................... 74/866; 364/424.1; 192/4 A
[58] Field of Search ................... 74/866, 867, 846; 364/424.1, 431.01; 192/4 A

[56] References Cited

U.S. PATENT DOCUMENTS

| | | | |
|---|---|---|---|
| 3,426,624 | 2/1969 | Karig et al. | 192/4 A |
| 3,628,642 | 12/1971 | Ravenel | 192/4 A X |
| 3,700,079 | 10/1972 | Shirai et al. | 192/4 A |
| 4,350,234 | 9/1982 | Suga et al. | 192/4 A |
| 4,696,380 | 9/1987 | Kitz | 192/4 A |
| 4,703,428 | 10/1987 | Hosaka et al. | 364/431.01 X |
| 5,048,650 | 9/1991 | Takizawa | 74/866 X |
| 5,105,923 | 4/1992 | Iizuka | 192/4 A |

FOREIGN PATENT DOCUMENTS 63-251652 10/1988 Japan.
2-256953 10/1990 Japan.

Primary Examiner—Allan D. Herrmann
Assistant Examiner—William O. Trousdell
Attorney, Agent, or Firm—Foley & Lardner

[57] ABSTRACT

A control system for controlling an automatic transmission on a motor vehicle is disclosed. The control system comprises a vehicle speed sensor for detecting the vehicle speed; an engine load sensor for detecting the engine load; a brake pedal depression degree sensor for detecting the degree by which the brake pedal is depressed; and a downshift control device for forcing the transmission to carry out a downshift when the vehicle speed is lower than a predetermined speed, the engine load is lower than a predetermined load and the brake pedal depression degree is greater than a predetermined depression degree. The control system further comprises a changing device changes the predetermined depression degree in accordance with the condition which the transmission assumes.

8 Claims, 6 Drawing Sheets

FIG. 3

| | | C18 | C20 | C22 | C24 | B28 | B26 | OWC 30 | OWC 29 | GEAR RATIO | $\alpha_1 = 0.440$<br>$\alpha_2 = 0.493$ |
|---|---|---|---|---|---|---|---|---|---|---|---|
| D-RANGE | 1'ST SPEED | | | ○ | | | | ○ | ○ | $\dfrac{1+\alpha_2}{\alpha_2}$ | 3.027 |
| | 2'ND SPEED | | ○ | ○ | | ○ | | ○ | | $\dfrac{\alpha_1+\alpha_2+\alpha_1\cdot\alpha_2}{\alpha_2(1+\alpha_1)}$ | 1.619 |
| | 3'RD SPEED | | ○ | ○ | ○ | | | ○ | | 1 | 1.000 |
| | 4'TH SPEED | | | (○) | ○ | ○ | | | | $\dfrac{1}{1+\alpha_1}$ | 0.694 |
| ENGINE BRAKING | 1'ST SPEED | | | (○) | | | ○ | (○) | (○) | | |
| | 2'ND SPEED | | ○ | (○) | | ○ | | (○) | | | |
| | 3'RD SPEED | | ○ | (○) | ○ | | | (○) | | | |
| | 4'TH SPEED | | | (○) | ○ | ○ | | | | | |
| REVERSE | | ○ | | | | | ○ | | | $-\dfrac{1}{\alpha_1}$ | -2.272 |

…

CONTROL SYSTEM FOR AUTOMOTIVE AUTOMATIC TRANSMISSION

BACKGROUND OF THE INVENTION

1. Field of the Invention

The present invention relates in general to automatic transmissions, and more particularly, to control systems for controlling automotive automatic transmissions.

2. Description of the Prior Art

In order to clarify the task of the present invention, one conventional control system for an automotive automatic transmission will be outlined, which is disclosed in Japanese Patent First Provisional Publication 2-256953.

The control system shown by the publication is so constructed that when a brake pedal is depressed by a degree greater than a reference value, the transmission is forced to effect a downshift. That is, when, with the vehicle moving at a speed lower than a given value and with the throttle valve being fully closed, the brake pedal is depressed beyond the reference degree, a so-called "downshift instruction signal" is applied to a downshift actuating means of the transmission to achieve the downshift of the same. With this, engine braking is obtained at the time when the brake pedal is depressed under the above-mentioned condition.

In the control system, however, the reference value of the pedal depression for achieving the downshift is fixed. This means that it sometimes occurs that the downshift does not take place even when the vehicle is under a condition wherein the downshift is really needed. That is, when the depression degree of the brake pedal does not reach the reference value, the depression does not induce a downshift even when a change has been carried out, for example, from a D-range wherein an overdrive is permitted to another D-range wherein the overdrive is inhibited (that is, when the overdrive inhibiting switch has been operated ON). Of course, in this case, the downshift actuating means does not operate and thus the engine braking is not obtained. This deteriorates the drivablity of the vehicle.

SUMMARY OF THE INVENTION

It is therefore an object of the present invention to provide a control system for an automotive automatic transmission, which system is free of the above-mentioned drawbacks.

According to a first aspect of the present invention, there is provided a control system for controlling an automatic transmission on a motor vehicle. The control system comprises a vehicle speed sensor for detecting the speed at which the vehicle moves; an engine load sensor for detecting the engine load; a brake pedal depression degree sensor for detecting the degree by which the brake pedal is depressed; a downshift control means for forcing the transmission to carry out a downshift when the vehicle speed is lower than a predetermined speed, the engine load is lower than a predetermined load and the brake pedal depression degree is greater than a predetermined depression degree; and changing means for changing the predetermined depression degree in accordance with the condition which the transmission assumes.

According to a second aspect of the present invention, there is provided a control system for controlling an automotive automatic transmission having at least a first D-range in which an overdrive is permitted and a second D-range in which the overdrive is inhibited. The control system comprises a vehicle speed sensor for detecting the speed at which the vehicle moves; an engine load sensor for detecting the engine load; a brake pedal depression degree sensor for detecting the degree by which the brake pedal is depressed; a downshift control means for enforcedly carrying out a downshift of the transmission when the vehicle speed is lower than a predetermined speed, the engine load is lower than a predetermined load and the brake pedal depression degree is greater than a predetermined depression degree; and changing means for changing the predetermined depression degree in accordance with the condition which the transmission assumes.

BRIEF DESCRIPTION OF THE DRAWINGS

Other objects and advantages of the present invention will become apparent from the following description when taken in conjunction with the accompanying drawings, in which:

FIG. 3 is a TABLE showing ON/OFF conditions of various friction elements of the automatic transmission with respect to speeds selected in the transmission;

DETAILED DESCRIPTION OF THE INVENTION

Figure 1:
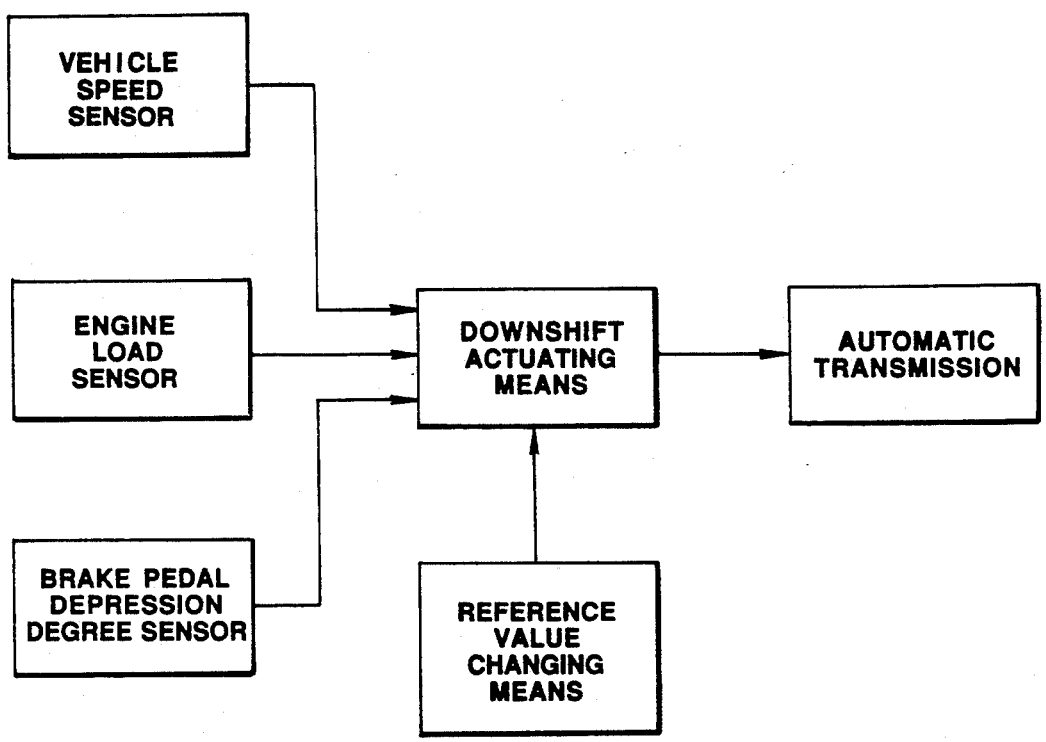
FIG. 1 is a block diagram showing the concept of the present invention.

Referring to the drawings, there is shown and embodiment of the present invention.

Figure 2:
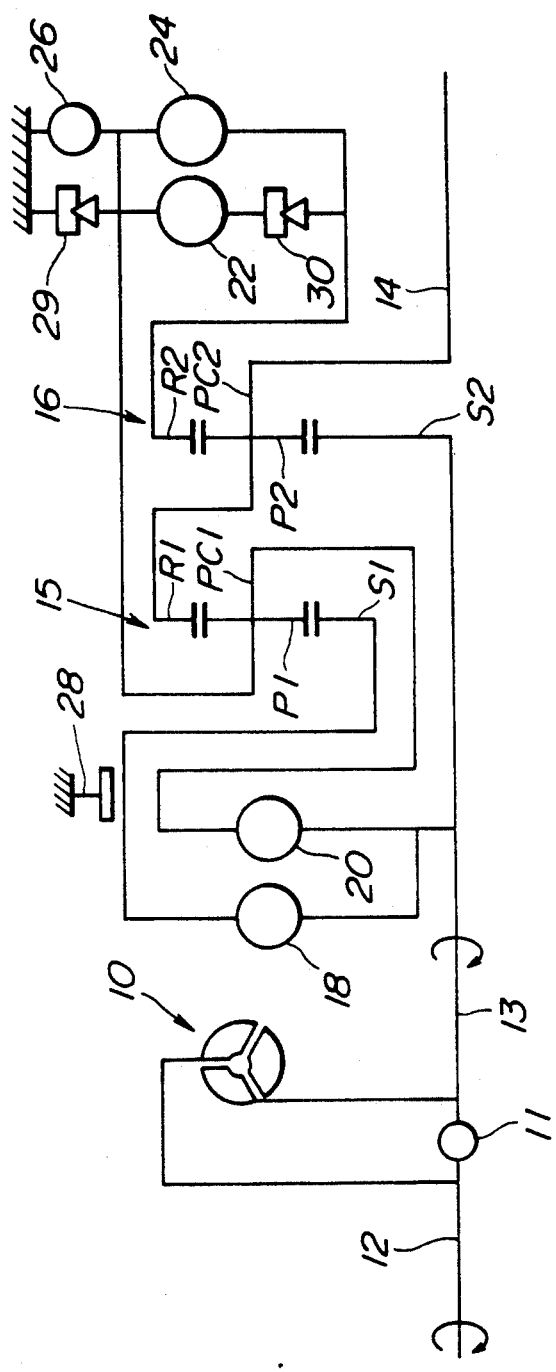
FIG. 2 is a schematic illustration of an automotive automatic transmission to which the present invention is applied.

In FIG. 2, there is schematically shown an automotive automatic transmission of a type having an overdrive, four forward speeds and one reverse.

The transmission comprises an input shaft 13 to which a torque of an engine output shaft 12 is transmitted through a torque converter 10. Designated by numeral 14 is an output shaft of the transmission through which a driving force is fed to a final drive device (not shown). Between the input and output shafts 13 and 14, there are disposed, in the illustrated manner, a first planetary gear unit 15, a second planetary gear unit 16, a reverse clutch 18, a high clutch 20, a forward clutch 22, an overrunning clutch 24, a low-and-reverse brake 26, a band brake 28, a low-oneway clutch 29 and a forward-oneway clutch 30.

The torque converter 10 has a lock-up clutch 11 installed therein.

The first planetary gear unit 15 comprises a sun gear S1, an internal gear R1, pinion gears P1 each meshing with both the sun gear S1 and the internal gear R1, and a pinion gear carrier PC1 carrying the pinion gears P1.

The pinion gear carrier PC1 is connectable to the input shaft 13 through the high clutch 20, and the sun gear S1 is connectable to the input shaft 13 through the reverse clutch 18.

The second planetary gear unit 16 comprises a sun gear S2, an internal gear R2, pinion gears P2 each meshing with both the sun gear S2 and the internal gear R2, and a pinion gear carrier PC2 carrying the pinion gears P2.

The pinion gear carrier PC1 of the first planetary gear unit 15 is connectable to the internal gear R2 of the second planetary gear unit 16 through the forward clutch 22 and the forward-oneway clutch 30 which are connected in tandem or through the overrunning clutch 24 which is arranged in parallel with the tandem connected clutches 22 and 30.

The sun gear S2 of the second planetary gear unit 16 is constantly connected with the input shaft 13, and the internal gear R1 of the first planetary gear unit 15 and the pinion gear carrier PC2 of the second planetary gear unit 16 are constantly connected with the output shaft 14.

The low-and-reverse brake 26 can fix the pinion gear carrier PC1 of the first planetary gear unit 15 and the band brake 28 can fix the sun gear S1 of the first planetary gear unit 15.

The low-oneway clutch 29 is so arranged as to permit only a normal rotation (viz., the rotation in the same direction as the engine output shaft 12) of the pinion gear carrier PC1 of the first planetary gear unit 15. That is, a reversed rotation of the pinion gear carrier PC1 is suppressed by the clutch 29.

By the selectively engaging and disengaging the clutches 18, 20, 22, 24, 29 and 30 and the brakes 26 and 28 in various combinations, the elements (viz., S1, S2, R1, R2, PC1 and PC2) of the first and second planetary gear units 15 and 16 are forced to change their operating conditions. With this changing, the ratio of rotation speed of the output shaft 14 relative to that of the input shaft 13 can be variously changed.

FIG. 3 is a table showing the various gear speeds (viz., first, second, third and fourth forward speeds and a reverse) which are given by the ON/OFF conditions of the clutches 18, 20, 22, 24, 29 and 30 and the brakes 26 and 28.

In the table, the mark "O" means "ON" or engaged condition of the associated clutch or brake and "blank" means "OFF" or disengaged condition of the same. The mark "(O)" means engaged condition of an associated clutch or brake. However, this engaged condition does not participate in power transmission in the established gear speed. It is to be noted "α1" or "α2" is a ratio of the number of teeth of the sun gear S1 or S2 relative to that of the internal gear R1 or R2, and the "GEAR RATIO" is the ratio of the rotation speed of the input shaft 13 relative to that of the output shaft 14.

Figure 4:
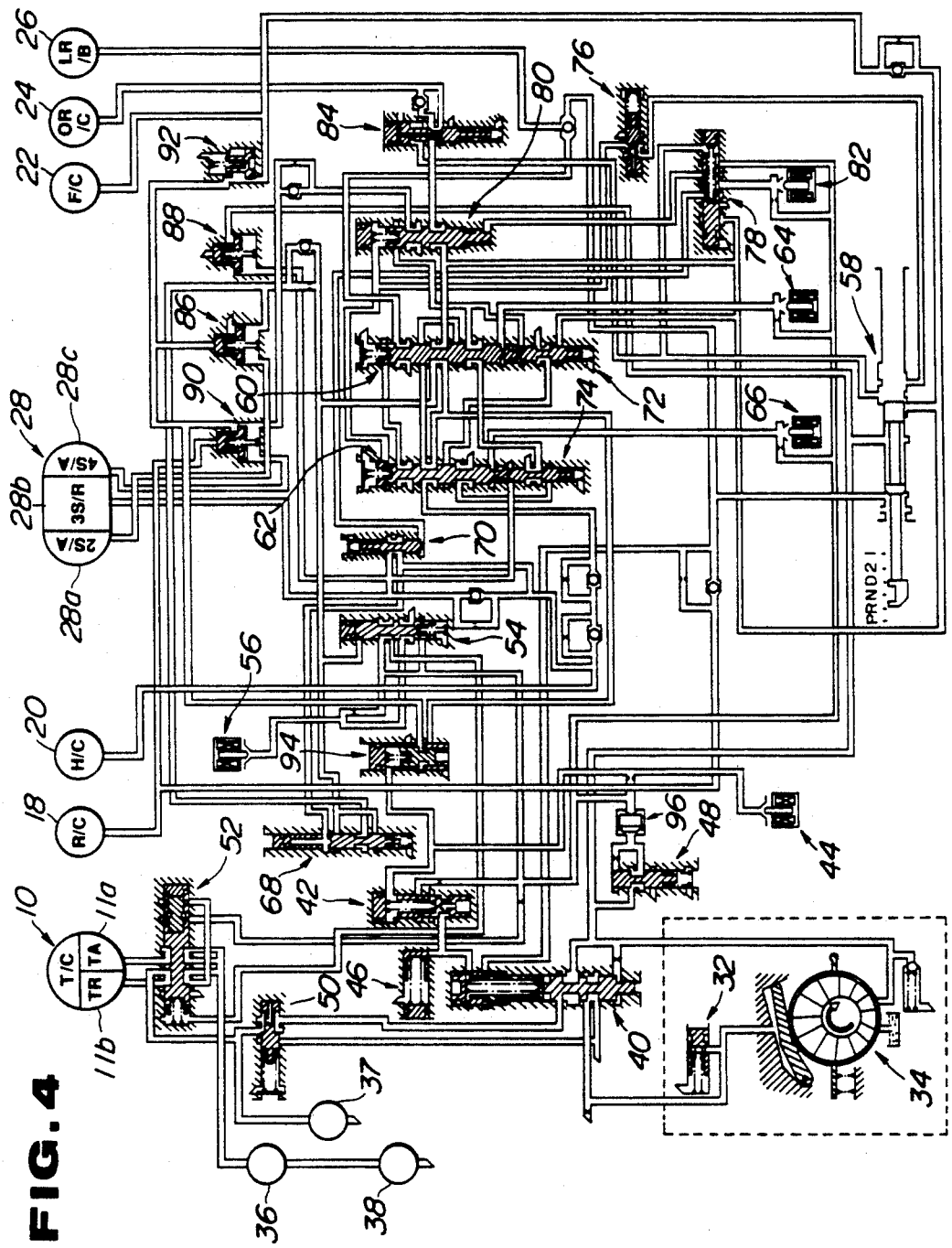
FIG. 4 is a hydraulic circuit of the automatic transmission.

FIG. 4 shows a hydraulic control circuit for controlling operation of the above-mentioned automatic transmission. The control circuit comprises a line pressure control valve 40, a pressure modifier valve 42, a line pressure control solenoid 44, a modified pressure accumulator 46, a pilot valve 48, a torque converter relief valve 50, a lock-up control valve 52, a first shuttle valve 54, a lock-up control solenoid 56, a manual valve 58, a first shift valve 60, a second shift valve 62, a first shift solenoid 64, a second shift solenoid 66, a servo-charger valve 68, a 3-2 timing valve 70, a 4-2 relay valve 72, a 4-2 sequence valve 74, a first reducing valve 76, a second shuttle valve 78, an overrunning clutch control valve 80, an overrunning clutch solenoid (viz., engine brake controlling solenoid) 82, an overrunning clutch reducing valve 84, a 1-2 accumulator 86, a 2-3 accumulator 88, a 3-4 accumulator 90, a N-D accumulator 92, an accumulator control valve 94 and a filter 96. These elements are connected in such a manner as is shown in the drawing.

The torque converter 10 has therein pressure apply and release chambers 11a and 11b for the lock-up clutch 11. This torque converter 10, the forward clutch 22, the high clutch 20, the band brake 28, the reverse clutch 18, the low-and-reverse brake 26 and the overrunning clutch 24 are connected to the hydraulic control circuit in the illustrated manner. The band brake 28 has a pressure apply chamber 28a for the second speed, a pressure release chamber 28b for the third speed and a pressure apply chamber 28c for the fourth speed incorporated therewith.

An oil pump 34 of capacity variable vane type, an oil cooler 36, a front lubrication circuit 37 and a rear lubrication circuit 38 are connected in the illustrated manner. The oil pump 34 is equipped with a feedback accumulator 32.

The hydraulic control circuit of this type is described in detail in Japanese Patent First Provisional Publication No. 63-251652.

Figure 5:
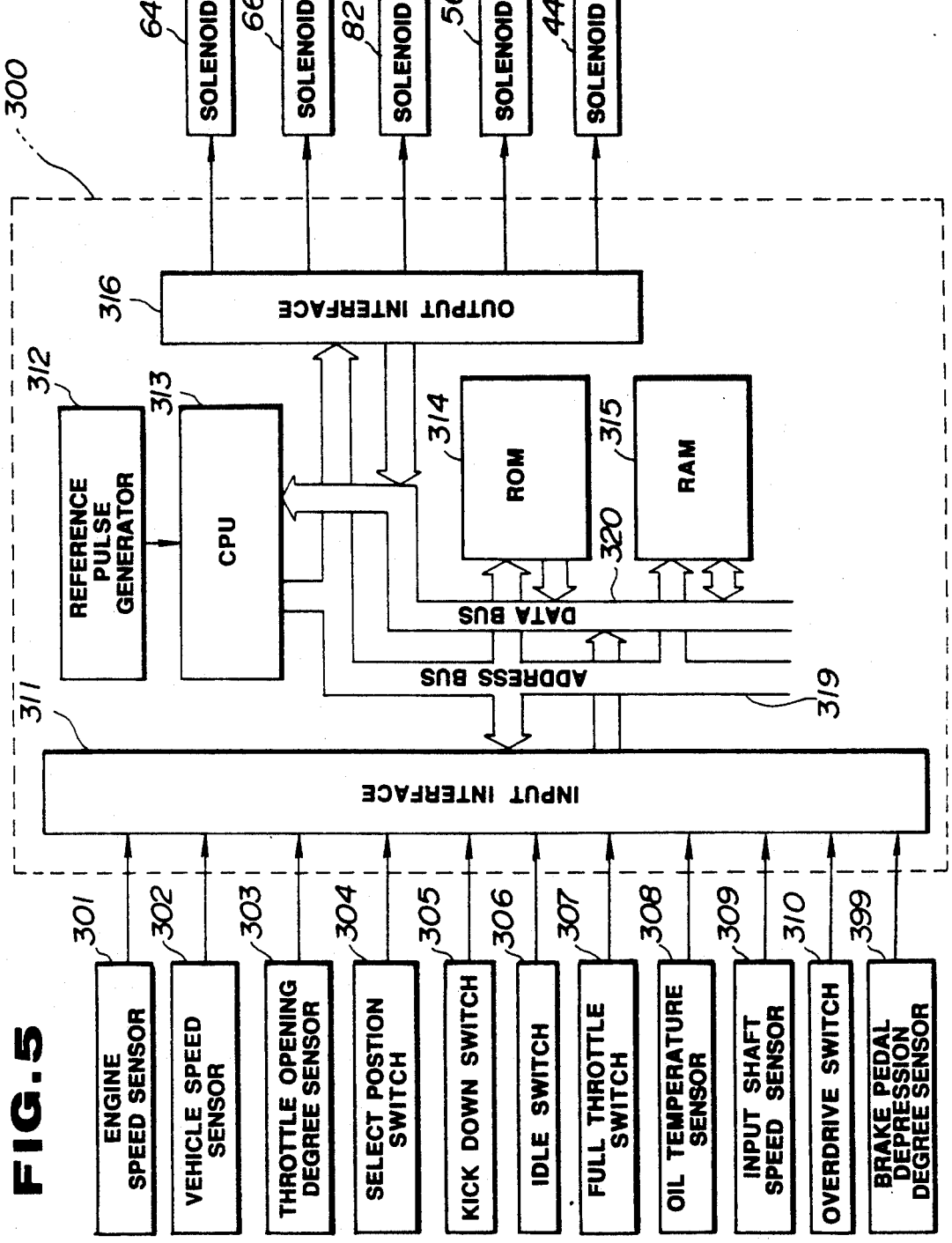
FIG. 5 is a schematic view of a control unit for controlling the transmission.

FIG. 5 shows schematically a control unit 300 which controls the operation of the solenoids 44, 56, 64, 66 and 82. As shown, the control unit 300 comprises an input interface 311, a reference pulse generator 312, a central processing unit (CPU) 313, a read only memory (ROM) 314, a random access memory (RAM) 315 and an output interface 316, an address bus 319 and a data bus 320.

Information signals from an engine speed sensor 301, a vehicle speed sensor 302, a throttle valve opening degree sensor 303, a select position switch 304, a kick down switch 305, an idle switch 306, a full throttle switch 307, an oil temperature switch 308, an input shaft speed sensor 309, an over-drive switch 310 and a brake pedal depression degree sensor 399 are fed to the input interface 311 of the control unit 300.

The brake pedal depression degree sensor 399 is a known device which can detect the degree by which the brake pedal is depressed.

Instruction signals from the output interface 316 of the control unit 300 are fed to the first shift solenoid 64, the second shift solenoid 66, the overrunning clutch solenoid 82, the lock-up control solenoid 56 and the line pressure control solenoid 44.

Figure 6:
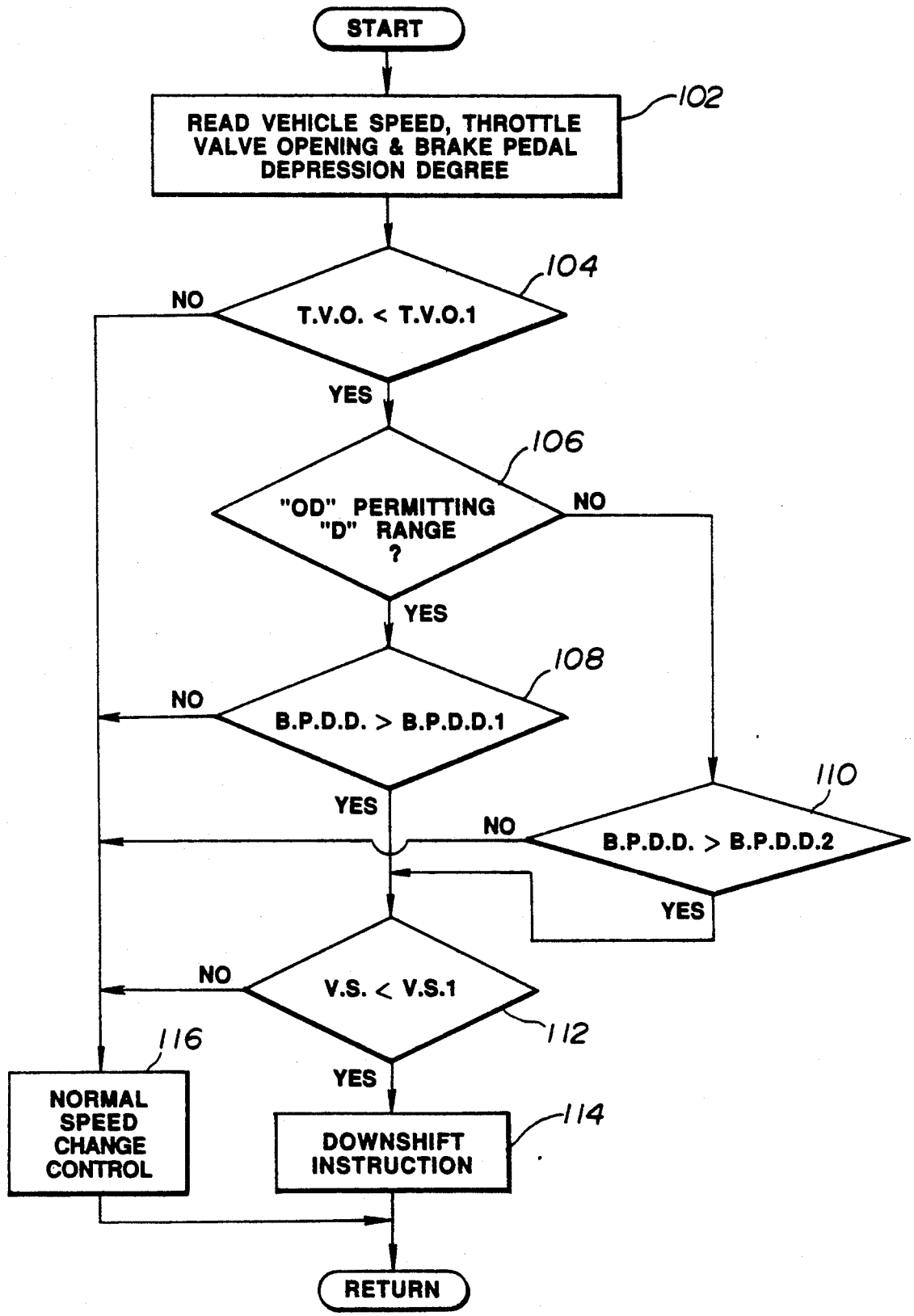
FIG. 6 is a flowchart showing operation steps carried out in a computer of the control unit.

Enforced downshift is carried out in such a manner as is depicted in the flowchart of FIG. 6.

That is, at step 102, the vehicle speed (V.S.), the throttle valve opening degree (T.V.O.) and the brake pedal depression degree (B.P.D.D.) are read, which are represented by information signals issued from the vehicle speed sensor 302, the throttle valve opening degree sensor 303 and the brake pedal depression degree sensor 399, respectively.

Then, at step 104, a judgement is carried out as to whether the throttle valve opening degree (T.V.O.) is smaller than a predetermined degree (T.V.O.1.) or not. If NO, that is, when the throttle valve opening degree is larger than the predetermined degree (T.V.O.1.), the operation flow goes to step 116 which will be described hereinafter.

If YES at step 104, that is, when the throttle valve opening degree (T.V.O.) is smaller than the predetermined degree (T.V.O.1.), the operation flow goes to step 106. At this step 106, a judgement is carried out as to whether or not the transmission is in a D-range wherein the overdrive is permitted. If YES at this step 106, that is, when the transmission is in the overdrive permitting D-range, the operation flow goes to step 108.

At the step 108, a judgement is carried out as to whether the brake pedal depression degree (B.P.D.D.) is greater than a larger predetermined degree (B.P.D.D.1.) or not. While, if NO at the step 106, the operation flow goes to step 110 wherein a judgement is carried out as to whether the brake pedal depression degree (B.P.D.D.) is greater than a smaller predetermined degree (B.P.D.D.2.) or not. The smaller predetermined degree (B.P.D.D.2.) is smaller than the larger predetermined degree (B.P.D.D.1.).

If YES at either step 108 or step 110, that is, when the brake pedal depression degree (B.P.D.D.) is greater than the larger or smaller predetermined degree (B.P.D.D.1) or (B.P.D.D.2), the operation flow goes to step 112. At this step 112, a judgement is carried out as to whether the vehicle speed (V.S.) is lower than the predetermined degree (V.S.1.) or not. If YES, that is, when the vehicle speed (V.S.) is lower than the predetermined degree (V.S.1), the operation flow goes to step 114 wherein a downshift instruction signal is fed to the downshift actuating means of the transmission. With this, the automatic transmission is forced to effect the downshift to obtain an effective engine braking.

If NO at step 104, 108, 110, or 112, the operation flow goes to the step 116. At this step, a normal operation instruction signal is issued for controlling the transmission in normal manner.

Thus, when, with the throttle valve being closed and with the vehicle speed being smaller than the predetermined degree, the brake pedal is depressed, a downshift takes place.

It is however to be noted that, in the present invention, the depression degree of the brake pedal which induces the enforced downshift changes in accordance with whether or not the transmission is in the D-range wherein the overdrive is permitted. That is, when the transmission is in the overdrive permitting D-range, the downshift is induced by a larger or deeper depression of the brake pedal, while, when the transmission is in the range (for example, overdrive inhibiting D-range or 2'nd range) other than the overdrive permnitting D-range, the downshift is induced by a smaller or shallower depression of the brake pedal.

This means that, in the present invention, the engine brake assuredly takes place when the vehicle is under a condition wherein the downshift is really needed.

What is claimed is:

1. A control system for controlling an automatic transmission on a motor vehicle, said control system comprising:
   a vehicle speed sensor for detecting the speed at which the vehicle moves;
   an engine load sensor for detecting the engine load;
   a brake pedal depression degree sensor for detecting the degree by which the brake pedal is depressed;
   a downshift control means for forcing said transmission to carry out a downshift when the vehicle speed is lower than a predetermined speed, the engine load is lower than a predetermined load and the brake pedal depression degree is greater than a predetermined depression degree; and
   changing means for varying said predetermined depression degree in accordance with a select range which the transmission assumes.

2. A control, system as claimed in claim 1, in which said changing means varies said predetermined depression degree in accordance with whether an engine brake of the vehicle is really needed or not.

3. A control system as claimed in claim 2, in which said changing means varies said predetermined depression degree to a first predetermined depression degree when the vehicle is under a condition wherein a downshift of the transmission is not really needed and varies said predetermined depression degree to a second predetermined depression degree when the vehicle is under another condition wherein the downshift of the transmission is really needed, said first predetermined depression degree being greater than said second predetermined depression degree.

4. A control system as claimed in claim 3, in which said engine load sensor is throttle valve opening degree sensor which detects the opening degree of a throttle valve of the engine.

5. A control system for controlling an automotive automatic transmission having at least a first D-range in which an overdrive is permitted and a second D-range in which the overdrive is inhibited, said control system comprising:
   a vehicle speed sensor for detecting the speed at which the vehicle moves;
   an engine load sensor for detecting the engine load;
   a brake pedal depression degree sensor for detecting the degree by which the brake pedal is depressed;
   a downshift control means for enforcedly carrying out a downshift of the transmission when the vehicle speed is lower than a predetermined speed, the engine load is lower than a predetermined load and the brake pedal depression degree is greater than a predetermined depression degree; and
   changing means for varying said predetermined depression degree in accordance with a select range which the transmission assumes.

6. A control system as claimed in claim 5, in which said changing means varies said predetermined depression degree in accordance with whether the transmission is in the first D-range or the second D-range.

7. A control system as claimed in claim 6, in which said changing means varies said predetermined depression degree to a first predetermined depression degree when said transmission is in the first D-range and varies said predetermined depression degree to a second predetermined depression degree when said transmission is in the second D-range, said first predetermined depression degree being greater than said second predetermined depression degree.

8. A control system as claimed in claim 7, in which said engine load sensor is throttle valve opening degree sensor which detects the opening degree of a throttle valve of the engine.

* * * * *